United States Patent [19]

Koch

[11] Patent Number: 4,545,555
[45] Date of Patent: Oct. 8, 1985

[54] ADJUSTABLE ARM MEMBER FOR USE WITH A LAMP OR THE LIKE

[76] Inventor: Mark B. Koch, 203 W. 103rd St. #4B, New York, N.Y. 10025

[21] Appl. No.: 627,183

[22] Filed: Jul. 2, 1984

[51] Int. Cl.⁴ .............................................. A47F 5/13
[52] U.S. Cl. ................................. 248/280.1; 248/462
[58] Field of Search ............... 248/280.1, 278, 462, 248/284, 282, 316.4, 276, 274; 403/55, 53, 54, 62

[56] References Cited

U.S. PATENT DOCUMENTS

| | | | |
|---|---|---|---|
| 3,374,347 | 3/1968 | Hirose | 248/284 |
| 3,489,384 | 1/1970 | Perbal | 248/280.1 |
| 3,820,752 | 6/1974 | Oram | 248/278 |

FOREIGN PATENT DOCUMENTS 2655819  3/1978  Fed. Rep. of Germany ...... 248/276

Primary Examiner—Ramon S. Britts
Assistant Examiner—Karen Chotkowski

[57] ABSTRACT

An adjustable arm includes a base member with a base rotatable joint member connected thereto, a lower arm having one end connected to the base rotatable joint member with a central joint member connected to the other end thereof and also to one end of an upper arm while a head joint member is connected to the other end of the upper arm. An elongated means under tension is provided within the arms and about the joint members for maintaining the position of the head end in given angular position.

5 Claims, 4 Drawing Figures

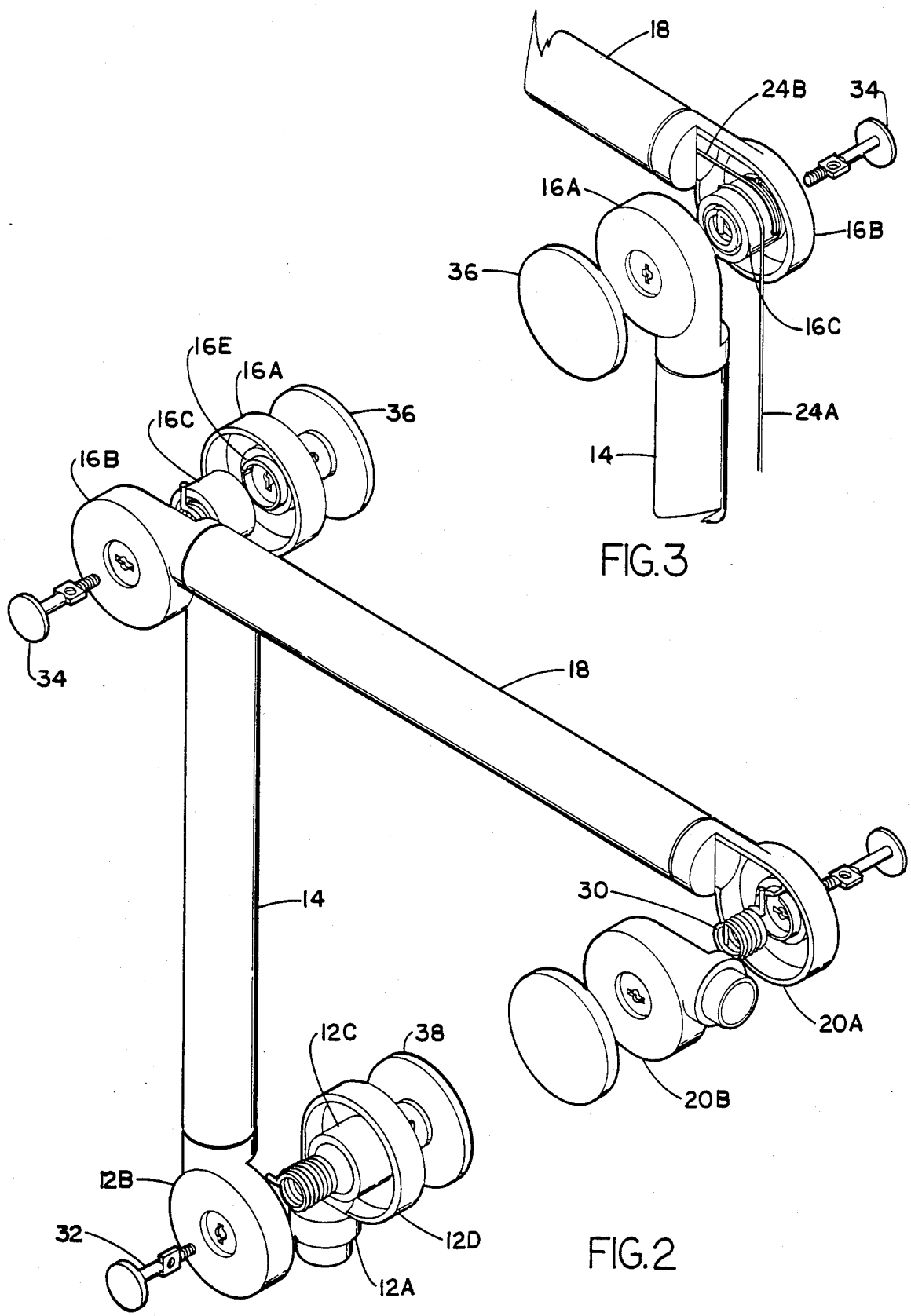

ADJUSTABLE ARM MEMBER FOR USE WITH A LAMP OR THE LIKE

BACKGROUND OF THE INVENTION

This invention pertains to articulated adjustable arms and, more particularly, to such arms which can be freely movable and maintained in desired positions. Adjustable articulated arms have many uses. A very desirable use is for a lamp to place the necessary working light where it is needed. The two most prominent methods to effect such support are (1) directly friction loading to the joints so that they grip to support the load and (2) counterbalancing the load by use of springs.

The least responsive method is the first since the articulated arms have locking or gripping joints that hold the load of the lamp by force or structural strength. To adjust the lamps that use this method, a user must release the grip or lock in the joint, support the hold while the adjustment is made and then relock the grip to hold the arm in the new position. A variation of this method is shown in U.S. Pat. No. 3,820,752 in which three radii are gripped and held in position by a cable that wraps at least once around a drum fastened to each joint and grips the drum as tension is applied to the end of the cable by means of a spring. The tension applied to the cable need only be sufficient to cause the cable to bite the drum. This patent likens the principle of the support of the arm to the method by which a ship can be held at dock by a rope wrapped once or twice around a bollard and then held by a workman. In this patent, the drum acts as the bollard and the spring as the workman. To adjust this support the tension of the cable must be released in order to free the drums from the grip of the cable, allowing the arm to be repositioned. The cable tension must then be reapplied to grip the drums and hold the arm in its new position. Such a scheme is impractical when frequent adjustments of the lamp position are required since each adjustment necessitates the routine of unlocking, supporting the lamp while repositioning and relocking after the new position is reached.

Lamp arms that are properly counterbalanced can be adjusted without releasing any mechanisms to swing the joint for movement. Friction can be applied in the joints to control the ease of motion but not so much friction as to lock or force the joints to grip in position. Examples of such spring counterbalanced lamp arms can be found in U.S. Pat. Nos. 2,395,178 and 3,374,347 wherein the base and middle joints are springloaded and friction is applied to aid in the counterbalancing. A problem with lamps of this type is that when the position of the lamp arm is adjusted the angle of the lamp head or bulb housing changes and must be adjusted to compensate for the change. A very good variation of this principle is shown in the well known Luxo-type arm which employs four large external springs, three structural members in the base section and two structural members in the top portion of the arm. The support members are fastened at the joints in such a way that when the arm is moved, the lamp head remains at a constant angle. The large external springs and friction in the joints counterbalance the load. The Luxo-type has now been modified to a type called the "K" arm that requires only two base structural members and two members in the top portion of the arm and has internalized springs in the support members. In both versions, the principle that allows the lamp head angle to remain constant is the same. These two types of lamp arms are the most widely used types available; however, the Luxo-type lamp has several drawbacks in that it requires many different parts. In addition, the joint configuration places restrictions on the movement of the arm. There is also objection to its exposed parts which collect dirt.

SUMMARY OF THE INVENTION

It is, accordingly, an object of the invention to provide an articulated arm suitable for use in lamps that counterbalances the state of a load and allows for easy adjustments while maintaining a constant angle of the lamp head joints with any position to which the arm is moved.

It is another object of the invention to provide an arm of the type being discussed which is easier and less expensive to manufacture and assemble while having more flexibility than presently available adjustable arms.

Briefly, the invention contemplates an adjustable arm having a base member with a base rotatable joint member connected to the base member. A lower arm has one end connected to the base rotatable joint member and another end connected to a central joint member. The central joint member is also connected to another arm having one end connected to a central joint member and its other end connected to a head joint member. Cable means under tension within the arms and about the joint members maintain the position of the head end in a given position and counterbalance the arms. (It should be noted that it is contemplated that the head end would support a light element.)

BRIEF DESCRIPTION OF THE DRAWINGS

Other objects, the features and advantages of the invention will be apparent from the following detailed description which shows, by way of example and not limitation, the presently preferred embodiment of the invention.

IN THE DRAWING

Figure 1:
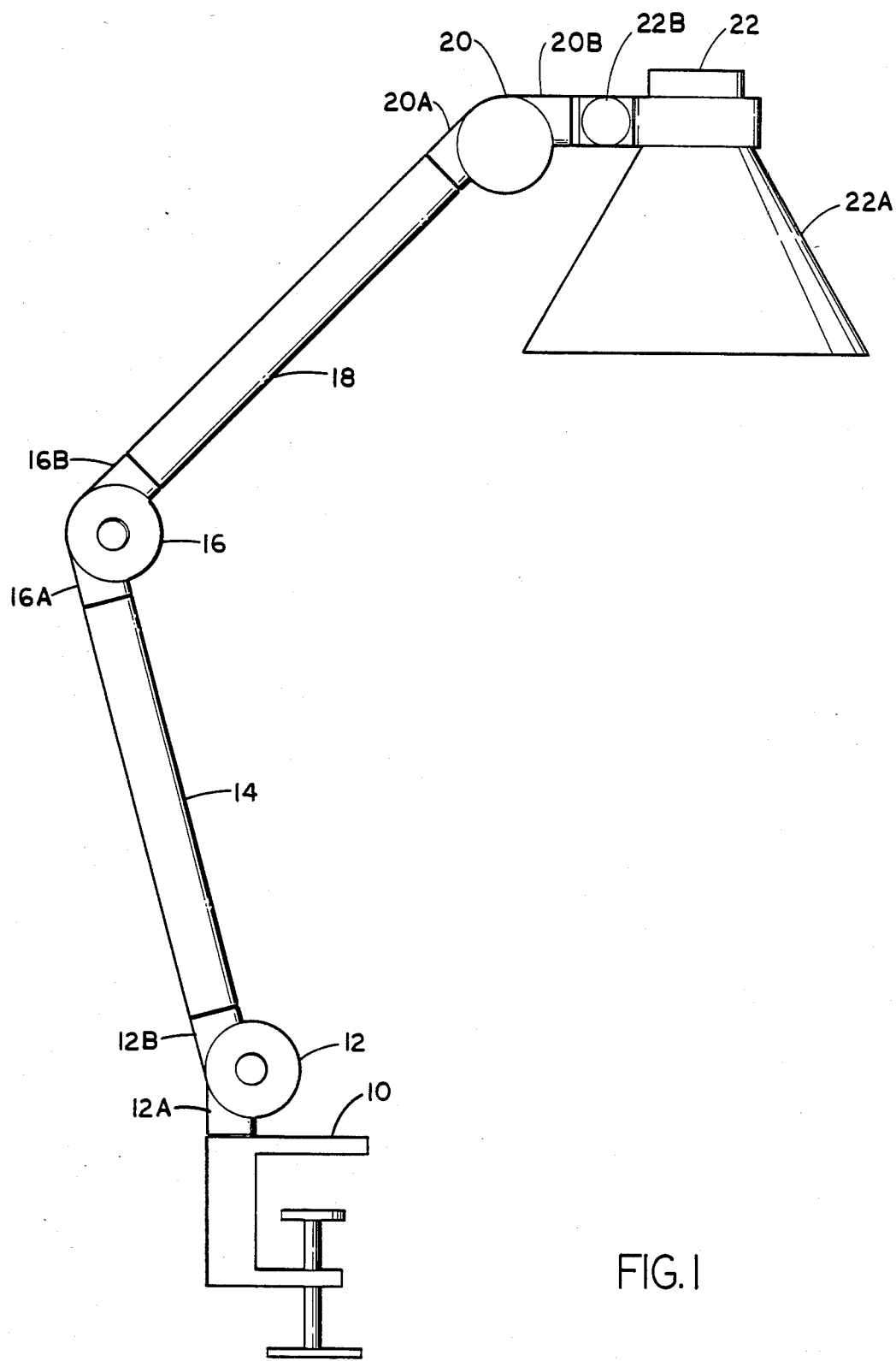
Figure 4:
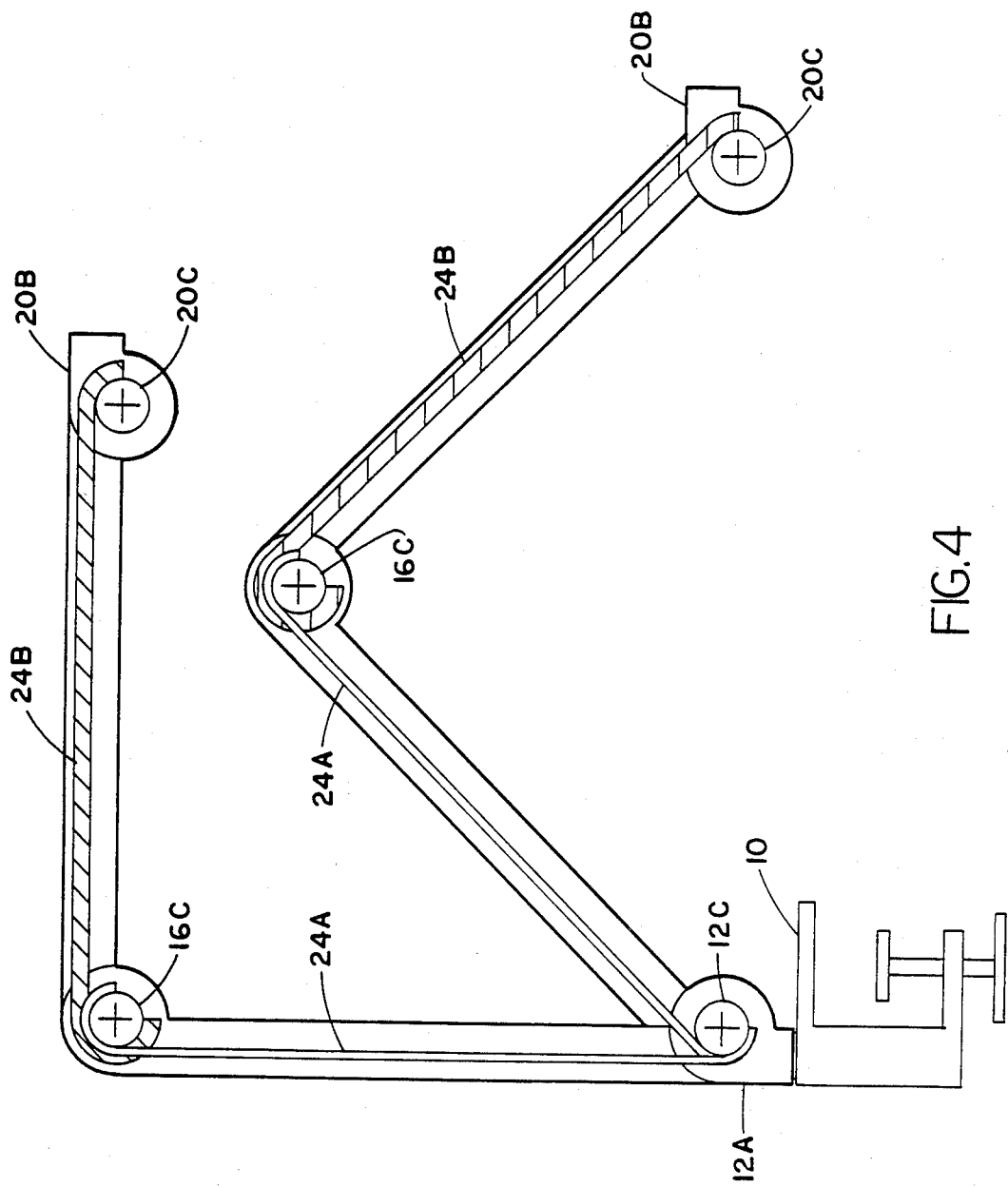

FIG. 1 is a side elevation of an adjustable arm in accordance with the invention;

FIG. 2 is an isometric assembly drawing of the arm of FIG. 1;

FIG. 3 is an isometric rear view assembly drawing of the center joint of the arm of FIG. 1;

FIG. 4 is a side elevation schematic of the arms in two positions used in explaining the operation of the arm.

DETAILED DESCRIPTION OF THE PREFERRED EMBODIMENT OF THE INVENTION

In FIG. 1 there is shown a lamp in accordance with the teachings of the invention. The lamp includes a base which, by way of example, is shown as a C-clamp. Base 10 is connected to one part 12a of a base joint 12. The outer part 12b of the base joint is fixed to one end of a lower arm 14. The other end of lower arm 14 is connected to one part 16a of a central joint 16 whose other part 16b is connected to one end of an upper arm 18. The other end of upper arm 18 is connected to one part 20a of a head joint 20 while the other part 20b of the head joint 20 is connected to a light element 22. The light element can include a light socket (not shown), the light shade 22a with a wrist joint 22b to position the light.

Within the arms 14 and 18, which are identical hollow tubes, there is a cable means comprising two lengths of cable 24a and 24b (FIG. 4) The cable length 24a extends between the base joint 11 and the center joint 16 and the cable length 24b extends between the center joint 16 and the head joint 20. As will be described in more detail hereinbelow, the cable length 24a is partially wrapped around a base drum 12c and has one end fixed thereto. (See FIG. 2) The base drum 12c is fixed to one portion of the housing 12d of the base joint 12. The end of the cable 24a is fixed to the drum 12c by means not shown. The other end of cable 24a is fixed to central drum 16c (also see FIG. 2). The central drum 16c is freely rotatable in the joint and, in fact, the parts 16a and 16b are provided with inwardly extending axle members. A typical axle member is shown as part 16e in the joint part 16a. A similar axle member is also in part 16b. Also fixed to freely rotatable drum 16c is one end of the length of cable 24b (see FIG. 3). The other end of cable 24b is fixed to the head drum 20c in the head joint 20. The head drum 20c is fixed to the inner surface of part 20b (see FIG. 2). The other part 20a of the joint also has an inwardly extending axle member 20e for supporting the rotation of the drum member.

The operation of the arm is best described by making reference to FIG. 4. FIG. 4 shows schematically the operation of the arm from a first upright position to an extended position. When the lamp is pulled forward, the portion 20b of the joint head 20, the portion 12b of the base joint rotates and wraps cable around the drum 12c. Since this length of cable 24a is fixed, part of the cable 24a around central drum 16c is unwrapped. Since central drum 16c is freely rotating, the unwrapping of this cable causes part of the cable 24b to be wrapped around the drum 16c. This wrapping motion causes the other end of the cable 24b to unwrap from the drum 20c causing the portion of the joint 20b to rotate counterclockwise; therefore, as is shown in the lower position of FIG. 4, the portion 20b is still in the horizontal position. Since the light is connected thereto, the light still has a fixed angle with respect to the horizontal.

It should be noted in FIG. 4 that the drums are shown solid; however, as will be apparent from FIGS. 2 and 3, the drums themselves are hollow. Furthermore, although the cables are shown as two different materials, they are actually the same type of material; however, shading was used in one cable to clarify the operation of the arm. In addition, although the parts a and b of the joints were considered as parts, they are actually really housings.

Support is accomplished by placing the cables 24 under tension to counterbalance the weight of the lamp element 22. Tension is placed on the cable by using a spring 30 or other torsion device in the head joint. The spring is used to force the radius half of the joint 20 to pull the cable 24b. Since the drum 16c of the central joint 16 is free spinning, the tension goes through the upper cable 24b to the lower cable 24a and pulls against the base drum 12c which is stationary.

The counterbalancing action of the cable is supplemented by springs or other torsion devices in the center joint 16 and base joint 12 which apply force directly against the weight of the light element 22. Friction in the center and base joints caused by tightening the knobbed screws 32 and 34 into plates 36 and 38, respectively, also aid the support but no friction is applied to the head joint since it must rotate freely to permit head to remain at a constant angle.

What is claimed is:

1. An adjustable arm comprising: a base member; a base rotatable joint member connected to said base member, said base rotatable joint member including a base housing and a base drum member fixed to said housing; a lower arm having one end connected to said base rotatable joint member; a central joint member connected to the other end of said lower arm, said central joint member including a central housing and a freely-rotatable central drum member in said housing; an upper arm having one end connected to said central joint member; a head joint member connected to the other end of said upper arm; said head joint member including a head housing and a head drum member fixed in said housing; each of said drum members having an axis orthogonal to the axes of said arms; and an elongated means under tension within said arms and about said joint members for maintaining the position of the head end in a given angular position, said elongated means including a lower arm cable having one end fixed to and partially wrapped around said base drum member and another end fixed to and partially wrapped around said central drum member, and an upper arm cable having one end fixed to and partially wrapped around said central drum member and another end fixed to and partially wrapped around said head drum member.

2. The adjustable arm of claim 1 wherein: said base housing includes a first part to which said base drum member is fixed and to which supporting means can be fixed, and a second part connected to one end of said lower arm; said central housing includes a first part connected to the other end of said lower arm and a second part connected to one end of said upper arm, each of said parts including inwardly extending axle means around which said central drum member rotates; and said head housing includes a first part to which said head drum member is fixed, and a second part connected to the other end of said upper arm; and further comprising a lamp element connected to the first part of said head housing.

3. The adjustable arm of claim 2 further comprising means for controllably applying an axial force to the contacting regions of the first and second parts of either or both of said base and central housings to supply friction to assist in the maintaining of the positioning of the lamp.

4. The adjustable arm of claim 2 wherein said arms are hollow tubes through which the cables pass.

5. The adjustable arm of claim 2 wherein: said base drum member is hollow and the second part of said base housing includes an inwardly extending axle means about which said base drum member can rotate; said head drum member is hollow and the second part of said head housing includes an inwardly extending axle means about which said head drum member can rotate; and the second parts of said base housing and said head housing and both parts of said central housing are identical.

* * * * *